United States Patent Office 3,189,764
Patented June 15, 1965

3,189,764
AUTOMATIC AND REMOTE-CONTROL SYSTEMS BY MECHANICAL SPEED-COUNTERS
Vladimir Gavreau, Albert Calaora, and Marcel Miane, Marseille, France, assignors to Centre National de la Recherche Scientifique, Paris, France
Filed May 29, 1961, Ser. No. 113,243
Claims priority, application France, June 1, 1960, 828,805, Patent 1,266,583
4 Claims. (Cl. 307—115)

The present invention has for its object improvements in automatic control and remote-control systems making use of mechanical revolution counters where the cipher rollers have a step-by-step movement with a view to increasing the precision and/or the speed of such control systems.

A known method of automatic control of an industrial machine consists in associating with each rotating member to be controlled, such as a lathe lead-screw, a mechanical revolution counter actuating electric contacts in such manner that agreement between the indications of the speed-counter and those of a program device, such as a perforated tape apparatus, causes the emission of a control signal.

The advantages of this method are its simplicity, its reliability and its comparatively low cost. However, this method has the serious disadvantage of being slow. In fact, the maximum speed of a revolution counter with a step-by-step movement corresponds approximately to 5,000 units per minute, that is to say 500 revolutions per minute of the first cipher roller.

Furthermore, a revolution counter of this kind cannot give in practice an accuracy greater than one-tenth of a revolution.

A first object of the present invention, in particular to improve the precision of control by means of a step-by-step revolution counter, consists in associating with said revolution counter a precision marking device which is substituted for said counter from the electrical point of view and emits a control signal when the controlled shaft has reached the desired angular position, said step-by-step revolution counter continuing to be driven by the controlled shaft.

This substitution is effected at the precise moment when the tenths of revolutions roller has reached the desired position, marking of that position being effected with precision, either by connecting in series with the revolution counter a very accurate switch which closes the circuit ten times per revolution, during a rotation less than one-hundredth of a revolution for example, or by means of a reading device arranged directly on a cam-drum or disc controlling the electric contacts, associated with the revolution counter.

According to the invention, the precision marking device, mechanically driven at the same time as the revolution counter, may be constituted by a disc, or a drum provided with fine graduations, or narrow cams which correspond for example to hundredths of a revolution, and which are read by any appropriate known means. This precision marking device, when once connected with a source of electrical voltage, as indicated, remains so up to the moment when the controlled shaft having reached exactly the desired position, a control signal is emitted by said device which thus acts instead of the original revolution counter.

A further object of the present invention relates to the use of this control system with a control of the perforated paper type, in which there is employed an insulating drum provided with a number of metal rings insulated from each other, and comprising at least one ring per decimal order, the device being covered with perforated paper read by means of electric brushes of known type. Such a system of operation and control by perforated paper enables the electric circuits to be considerably simplified.

A further improvement contemplated by the present invention is a mechanical revolution counter with step-by-step movement and with electric decimal reading, characterized by the fact that the reading is effected directly on the cipher rollers, and by the fact that to every decimal order there corresponds one or more cipher rollers driven in synchronium, carrying a total of five cams, each of which actuates two electric contacts per revolution.

The electric contacts utilized will preferably be double contacts of the type employed in telephonic relays. According to the present invention, these contacts are actuated through the intermediary of a metallic blade without contacts, operated by the cam or cams arranged on the cipher rollers, the movements of this metal blade being transmitted to the contact-carrying blades by means of an insulating nipple.

In order to make the object and the advantages of the present invention more clearly understood, there will now be described below, by way of examples only and without any implied limitation, various devices according to the invention, these being considered separately or in any combination.

Reference will be made to the accompanying drawings, in which:

FIG. 1 diagrammatically shows a form of construction of a mechanical revolution counter with decimal reading, permitting quick control of a shaft with a precision of one-hundredth of a revolution.

FIG. 2 diagrammatically shows a form of construction of a mechanical revolution counter with binary reading, permitting of the rapid control of a shaft with a precision of one-hundredth of a revolution.

Figure 1:
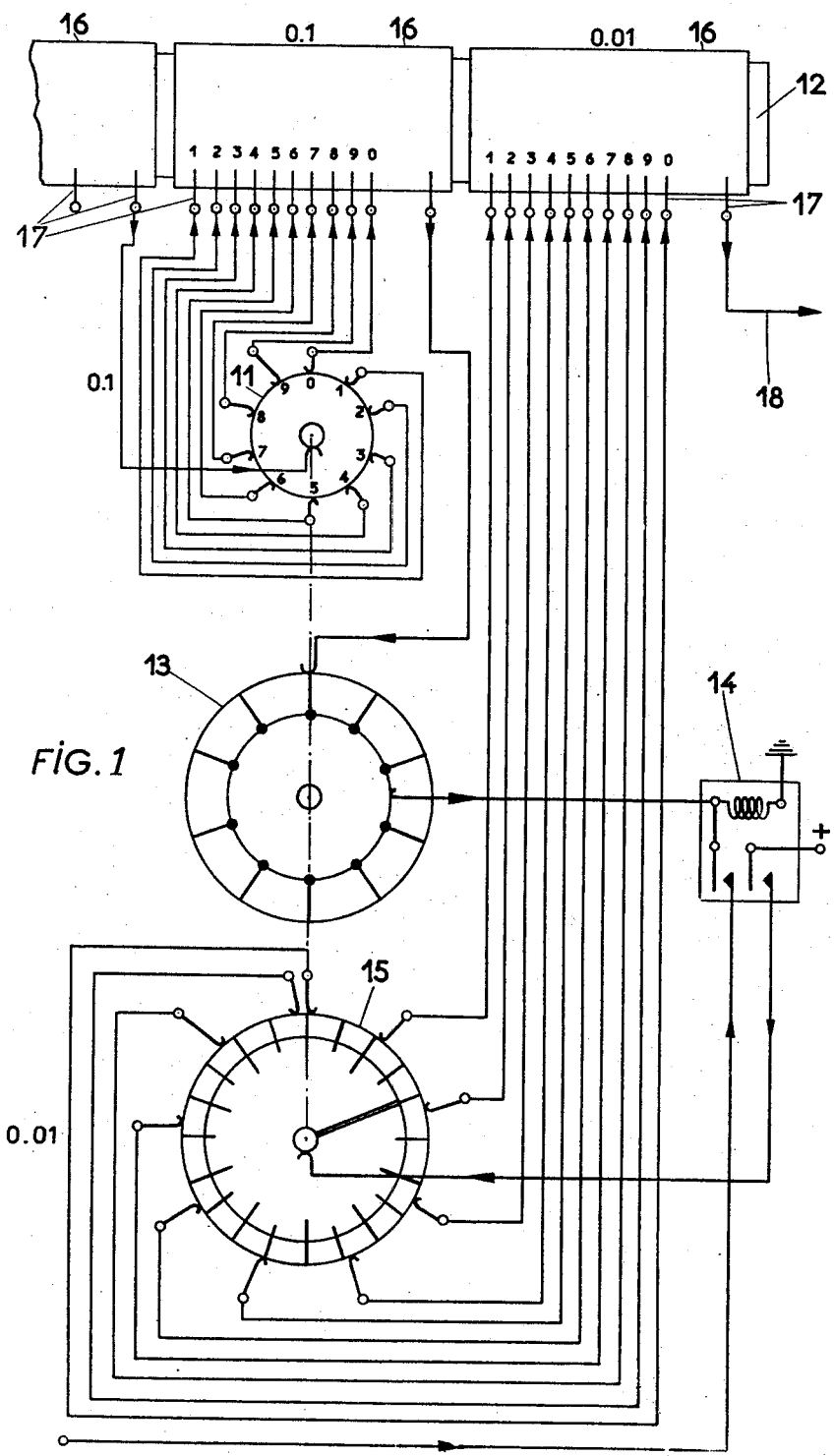

FIG. 1 diagrammatically shows a form of construction of a mechanical revolution counter with decimal reading permitting quick control of a shaft with a precision of one-hundredth of a revolution. In order to avoid complicating the drawing, we have shown only a single cipher roller of a mechanical revolution counter with a step-by-step movement, such as roller 11, rigidly fixed to the controlled shaft and which indicates the tenths of a revolution effected by said shaft. Such a mechanical revolution counter is described in our U.S. patent application Ser. No. 859,385 for "Automatic Control and Remote Control of Machine Tools," filed December 14, 1959.

Through the intermediary of the program-drum 12 and of a precision switch 13, the ten contacts of roller 11 are connected to an electric holding relay 14 through which voltage is applied to a precision marking device, constituted by a drum 15 comprising at its periphery ten cams (not shown), each actuating successively ten electric contacts so as to close each of the ten contacts ten times for every complete revolution of the drum corresponding to one revolution of roller 11.

Program drum 12 is made of an insulating material provided with conducting rings 16, and is covered with perforated paper, the indications of which are read by means of electric brushes 17 of conventional type, which are connected to the contacts of the different cipher rollers such as 11 and to the contacts of the precision-drum 15.

The operation of the above device is as follows: an indication being registered on the program-drum in numbers of revolutions and fractions of a revolution, when the revolution counter is nearing the position corresponding to this indication by an interval ranging from one to two revolutions, a slowing-down device of a conventional type (not shown) is brought into play to increase the precision of stopping. When roller 11 reaches approximately the position indicated, the corresponding contact of this roller is connected to an electric voltage source, but it is only just when precision switch 13 closes that current can reach relay 14 and be fed to precision drum 15. At this time drum 15 indicates a number of hundredths equal to a multiple of ten, namely 00, 10, 20, . . . 90. If the program-drum marks such a number, control current can pass along line 18 and stops the controlled shaft. If this is not the case, the rotation continues until the indication of drum 15 is in agreement with that entered on the program-drum, which results in the emission of the control signal.

Immediately afterwards, the program-drum is driven one notch forward by means of a ratchet wheel operated by a pawl which is in turn actuated by an electro-magnet, the latter also operating a contact which enables relay 14 to be brought back to the position of rest. This known driving device, which is employed in controls of this type, has not been shown in the drawing.

Figure 2:
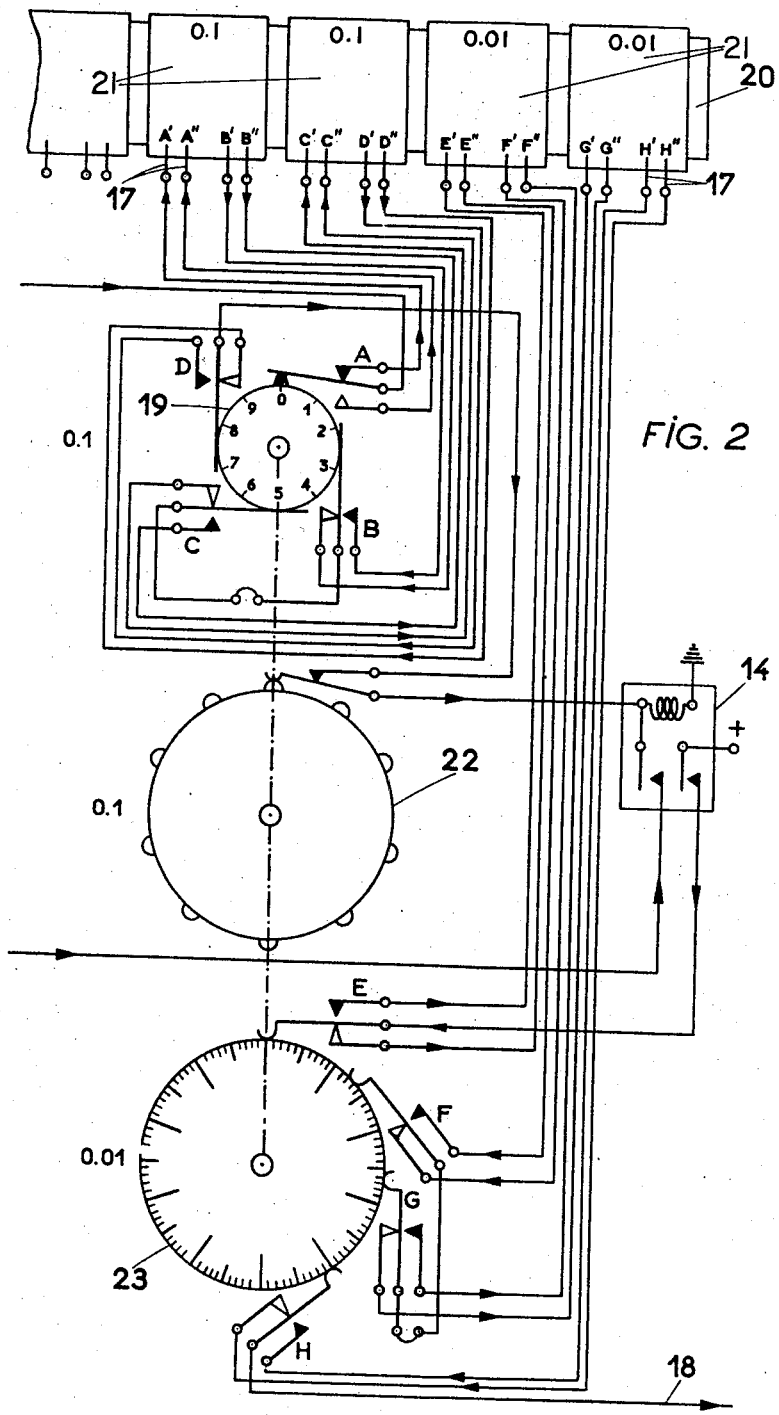

In FIG. 2, we have shown a form of embodiment of a mechanical revolution counter with binary reading, permitting quick control of a shaft with an accuracy of one-hundredth of a revolution.

In this case also, only the first figure-roller of the revolution counter has been shown at 19, this roller indicating the tenths of a revolution effected by the controlled shaft, with which the said roller is fast in rotation. Four contacts A, B, C, D, are necessary in this case for each roller, and cooperates with four rows of cams according to a conventional arrangement. These contacts will be for example of the so-called "reversing" type. In order to simplify the drawing, a single cam only has been shown; it can be seen how this cam operates one of the two contacts of the relay employed, which may be of the flexible blade type generally employed in telephony.

As in the case of FIG. 1, the controlling actions are carried out by means of a program-drum 20 of insulating material, on which are fixed metal rings 21, this drum being covered with perforated paper. In this case however, two metal rings correspond to each cipher roller, the rings being furthermore narrower than those of the drum 12 of FIG. 1. A precision switch 22, comprising ten very narrow cams, is connected in series with the circuits of roller 19. This switch operates a contact upon every tenth of a revolution for a very short time, corresponding to a rotation smaller than one-hundredth of a revolution, which enables the electric relay 14 to be kept in the holding position when so required.

Relay 14 serves to apply voltage to a precision drum 23 graduated in hundredths of a revolution and carrying four rows of cams (not shown) operating four reversing contacts E, F, G, H, the positions of which are compared with the indications carried by the program-drum 20.

The principle of operation is identical with that of the device of FIG. 1. When agreement has once been established between the indications of the program-drum and those of the various rollers of the step-by-step revolution counter, which includes the roller for the tenths of a revolution, this agreement being controlled with an accuracy greater than one-hundredth of a revolution by precision switch 22, relay 14 applies voltage to drum 23 corresponding to the hundredths of a revolution, where is emitted the stop signal when the number of hundredths entered on the program-drum is reached.

Without departing from the scope of the present invention, the holding relay 14 (FIGS. 1 and 2) may also be replaced by an equivalent device such as a thyratron or an electronic trigger circuit (flip-flop).

It will be understood that, as in all devices of this type, it will be advantageous to introduce a device for slowing-down the machine as the stopping point is approached.

Finally, we may, as in the case of the device of FIG. 1, replace the precision switch by a device comprising for example at least one cam and a high precision contact, this cam being arranged directly on the roller corresponding to the tenths of a revolution and closing said contact on every tenth of a revolution, for a very short time.

Figure 3:
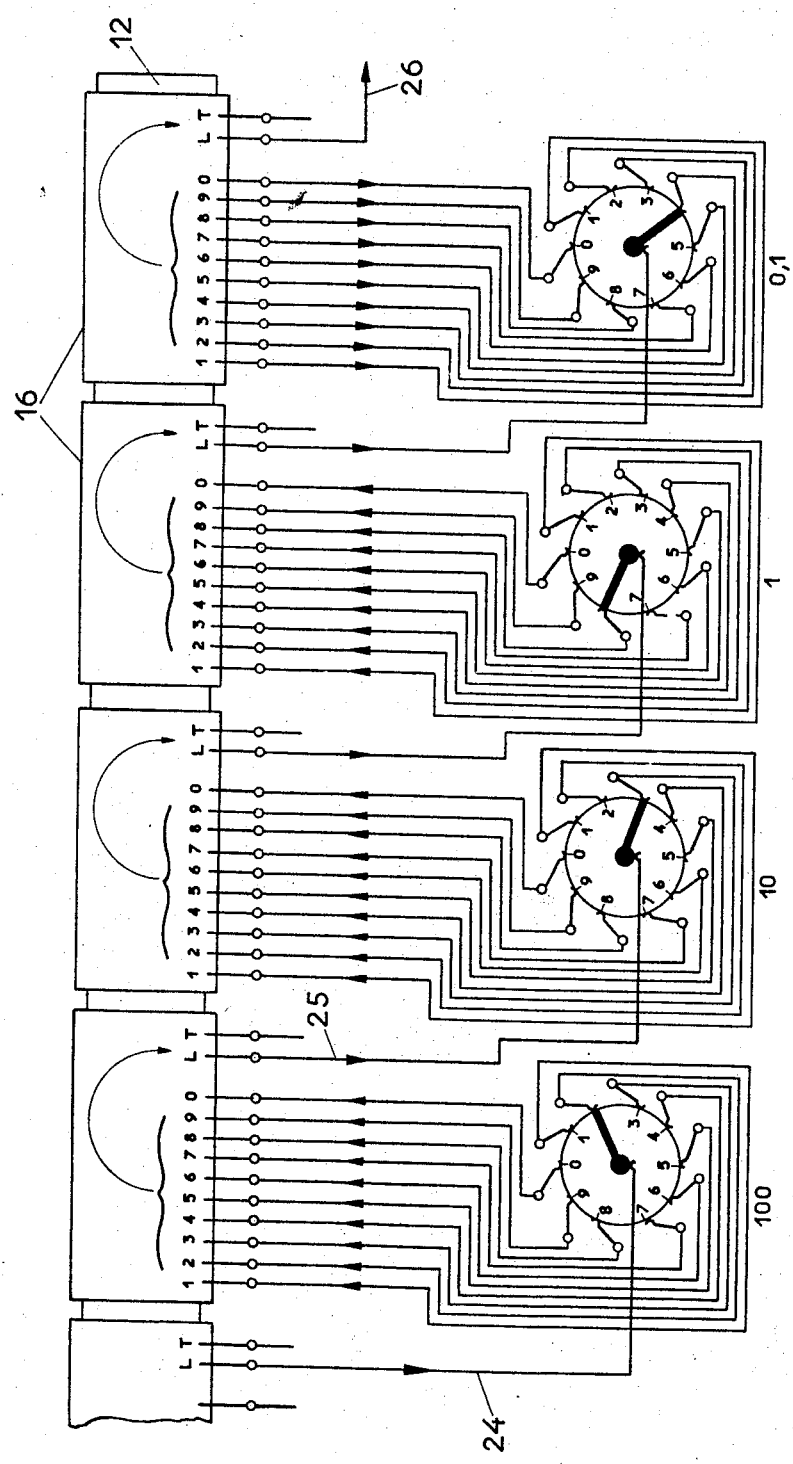
FIG. 3 shows the electric circuit diagram of a revolution counter with decimal reading by a program drum with multiple metal rings.

FIG. 3 shows a control device which can especially be employed in association with the device of FIG. 1. A program-drum 12 of insulating material is provided with metallic rings 16, each corresponding to a decimal order, this unit being covered with perforated paper read by means of electric brushes of conventional type, there being no necessity for the use of relays, which results in substantial simplification and economy. We have shown only the portion of the program-drum on which are inscribed the numerical indications corresponding to the revolution counter, and the indications of the auxiliary controls can obviously be read in the same way.

L and T show the positions of the indications corresponding to either of two different movements, such as the longitudinal and transverse movements of a tool in a machine. The operation of the device is as follows:

Current fed through the line 24 reaches the roller corresponding to the hundreds of revolutions, and if the indications agree, passes through the corresponding metal ring and is transmitted by conductor 25 to the following roller which is the roller corresponding to the tens of revolutions, and so on, up to the roller of the tenths of a revolution. In this way, current is transmitted to line 26 only when all the indications of the speed-counter are in agreement with those registered on the program-drum 12.

Of course, the line 26 may be connected, as above indicated, to a drum giving the hundredths of a revolution, for which drum the control indications could also be registered on program-drum 12, after the indications corresponding to the tenths of a revolution roller, this roller being located at the extreme right-hand side of FIG. 3.

Furthermore, an automatic slowing-down just before stopping may easily be obtained, for example for a rotation expressed by a number which differs from the number defining the desired rotation by only one unit, that is to say by one cipher of the units roller, the last but one on FIG. 3, for instance by utilizing a supplementary ring, the brushes of which are connected in parallel with those of the unit ring, and for which the perforation in the paper corresponds to cipher $n\pm 1$, where $n$ is the cipher of the units roller.

It should be noted here that the appearance of the program-drum for a binary reading of the rollers of the speed-counter would be similar to that of the drum of FIG. 3, with the only difference that every decimal order would necessitate two narrow metal rings instead of one wide metal ring, the indications being read on each of the narrow rings by four electric brushes also connected to the contacts of the revolution counter, without the intermediary of relays.

Figure 4:
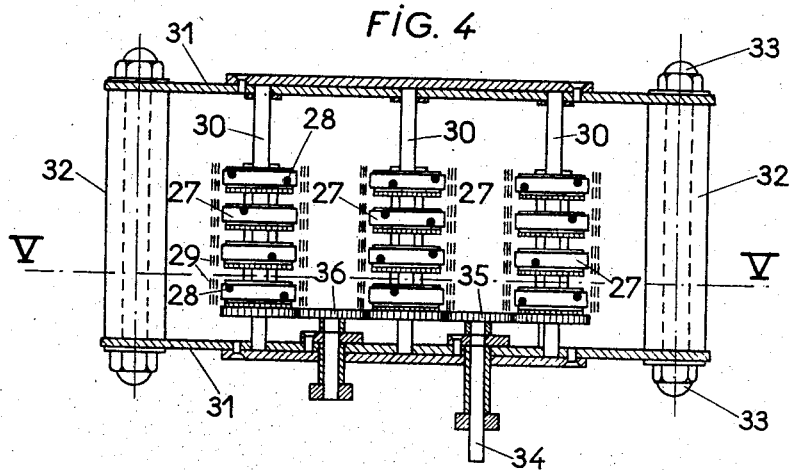
FIGS. 4 and 5 show respectively in cross-section on the line IV—IV of FIG. 5, and in cross-section on the line V—V of FIG. 4, a mechanical speed-counter with five cams and ten contacts per decimal order.
Figure 5:
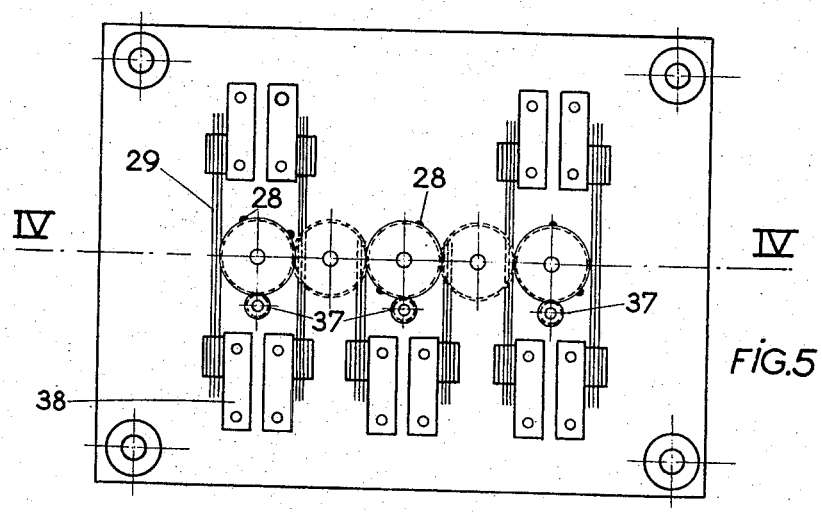

FIGS. 4 and 5 show respectively a view in cross-section along the plane IV—IV of FIG. 5, and a view in cross-section taken along the plane V—V of FIG. 4, in the case of a mechanical revolution counter with electrical decimal reading, in which three cipher rollers correspond to each decimal order.

The cipher rollers employed are shown at 27. These cipher rollers may be of the type conventionally used in quick mechanical revolution counters with step-by-step movement. Rollers of this type are fairly narrow and will preferably carry at most two cams 28, these cams being arranged in such manner that the three rollers corresponding to a decimal order and rotating in synchronism comprise a total of five cams, each of which operates successively two electric contacts 29 during the course of one complete revolution of the three rollers. Cams 28 may be constituted very simply by small round-headed screws.

The revolution counter shown by the drawing comprises four decimal orders, but this does not constitute a limitation. The supports on which the different cipher rollers can rotate freely have been represented by shafts 30. These shafts are held by plates 31 assembled together by means of spacing members 32 and bolts 33.

The input of the revolution counter consists of a shaft 34 which drives directly by means of a toothed wheel 35 the first right-hand roller and the centre roller, while the first left-hand roller is driven through the intermediary of a toothed wheel 36. The cipher rollers of higher decimal orders are driven by star-wheels 37 of the type usually employed in mechanical revolution counters.

Figure 6:
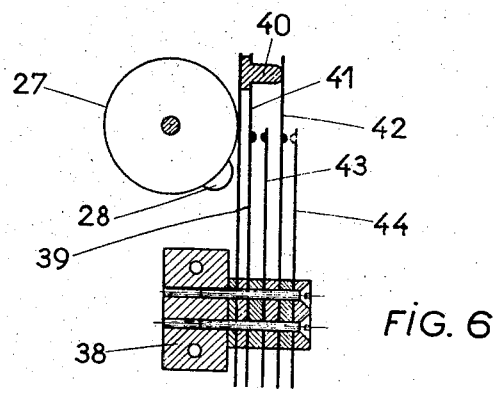
FIG. 6 is an elevational view of a double safety contact to be used with a revolution counter of the type shown by FIGS. 4 and 5.

Control of a double electric contact by a cam arranged on a cipher roller has been shown by FIG. 6. Cipher roller 27 carries a cam 28 which operates an auxiliary metal blade 39 which has no electric contacts. The movements of this blade 39 are transmitted by insulating nipple 40 to the metallic blades provided with electric contacts 39 and 42 which make contact respectively with the blades 43 and 44.

What we claim is:

1. In combination with a machine having a movable element, and with a rotating control member having, registered thereon, a program to be performed by said machine, a device for controlling the successive displacements of said machine movable element in accordance with said program which comprises, in combination, a step-by-step revolution counter operatively connected with said machine movable element, a precision marking member capable of controlling the operation of said machine, permanently operative means for mechanically coupling said marking member with said machine movable element and electrical switch means operative by said control member for automatically causing said precision marking member to control said machine shortly before the end of every displacement of said control member.

2. A device according to claim 1 further comprising a circuit for checking coincidence between the positions to be occupied by said element and the actual positions of said element respectively, said electrical switch means comprising a precison switch operatively connected permanently with said revolution counter and a relay including a winding and two contacts, said winding being arranged to be energized by the closing of said switch, the first of said two contacts being adapted, when said winding is energized, to hold said switch in the position it then occupies, the other of said contacts being adapted to feed current to said circuit.

3. A device according to claim 1 further comprising a circuit for checking coincidence between the positions to be occupied by said element and the actual positions of said element respectively, said electrical switch means comprising a precision switch operatively connected permanently with said revolution counter and a relay including a winding and two contacts, and winding being arranged to be energized by the closing of said switch, the first of said two contacts being adapted, when said winding is energized, to hold said switch in the position it then occupies, the other of said contacts being adapted to feed current to said circuit, said revolution counter comprising cipher rollers, said cipher rollers, said precision marking member and said precision switch being cylindrical pieces, cams distributed over the periphery of said cylindrical pieces and fixed contacts adapted to cooperate with said cams, respectively.

4. A device according to claim 3 wherein said precision marking member and said precision switch are operatively connected with said revolution counter so as to rotate at the same speed as it does.

References Cited by the Examiner
UNITED STATES PATENTS

| | | | |
|---|---|---|---|
| 2,852,728 | 9/58 | Samson | 307—115 |
| 2,898,483 | 8/59 | Muller | 307—115 |

LLOYD McCOLLUM, *Primary Examiner.*